J. P. FORST.
MOWER.
APPLICATION FILED OCT. 20, 1913.
1,106,374.
Patented Aug. 11, 1914.
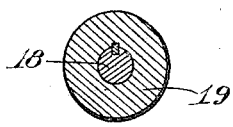
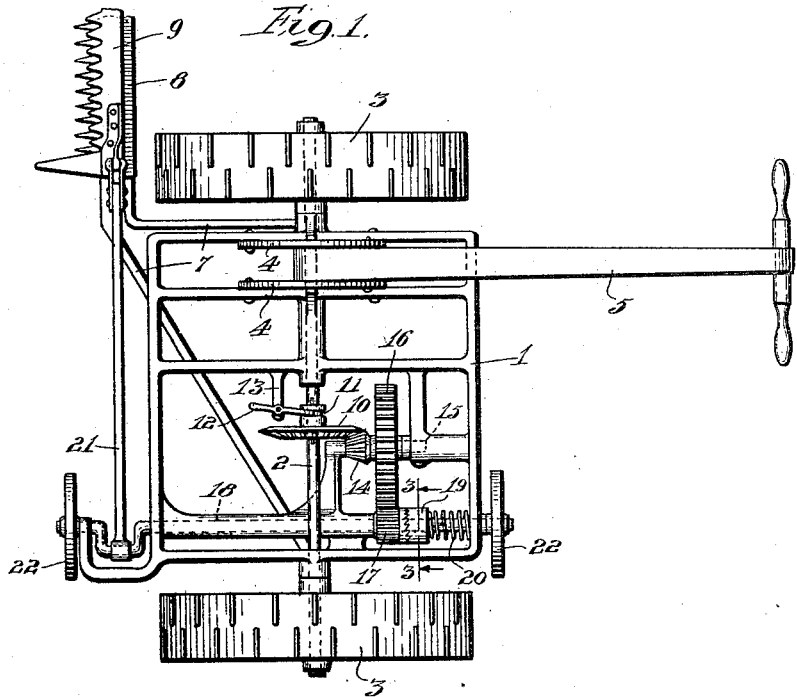
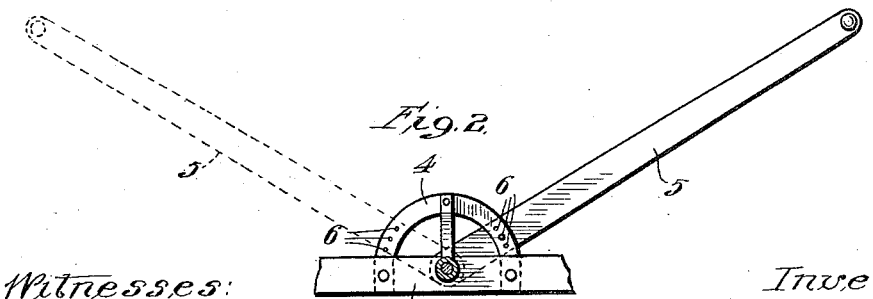
Inventor
John P. Forst,

UNITED STATES PATENT OFFICE.

JOHN P. FORST, OF CHICAGO, ILLINOIS.

MOWER.

1,106,374.   Specification of Letters Patent.   Patented Aug. 11, 1914.

Application filed October 20, 1913. Serial No. 796,266.

*To all whom it may concern:*

Be it known that I, JOHN P. FORST, a citizen of the United States, and a resident of the city of Chicago, county of Cook, and State of Illinois, have invented certain new and useful Improvements in Mowers, of which the following is a specification.

My invention relates to hand operable mowing machines and the object of this improvement is to provide a simple and effective machine of the character mentioned provided with fly wheels and a spring operable clutch and in which the momentum of the fly wheels operate the knife of the machine after forward movement of the latter has ceased in order to clear the knife of grass, weeds or the like.

Other objects will appear hereinafter.

The invention consists in the combinations and arrangements of parts hereinafter described and claimed.

The invention will be best understood by reference to the accompanying drawing forming a part of this specification, and in which, Figure 1 is a plan view of a mower built in accordance with my invention, Fig. 2 is a fragmental view of a portion of the same showing the mounting of the handle thereof, and Fig. 3 is an enlarged section of a clutch member used in the construction taken on line 3—3 in Fig. 1.

The preferred form of construction as illustrated in the drawing comprises a frame 1 in which is journaled an axle 2. Drive wheels 3 are mounted on axle 2 in a manner to cause rotation of said axle with said drive wheels. Secured to the frame 1 are two circular guide plates 4 between which the operating handle 5 is mounted on a portion of the frame 1 around axle 2. Handle 5 is adapted to swing from its full line position, indicated in Fig. 2 when the machine is pushed, to its dotted line position shown in Fig. 2 when the device is pulled. A plurality of perforations 6 are provided in the plates 4 to accommodate setting the handle 5 at different heights to accommodate the different heights of operators who may operate the machine. A suitable pin is placed through the opening 6 and a corresponding opening in handle 5 to lock the handle in a desired position.

Carried at one side of frame 1 on supporting bars 7 is a cutter bar 8. In the cutter bar 8 is reciprocally mounted a knife 9. The supporting bars 7, cutter bar 8 and knife 9 are of ordinary construction.

Splined on the axle 2 is a gear 10 having a circular groove 11 in its hub and the circular groove 11 is engaged by a hand operable lever 12 pivoted to a lug 13 on frame 1. The purpose of handle 12 is to move the gear 10 into and out of mesh with a gear 14 on jack shaft 15, the latter being journaled in frame 1, as clearly illustrated in Fig. 1. On the jack shaft 15 is a large gear 16 which meshes with a small gear 17, the latter being loosely mounted on a crank shaft 18. Splined on the crank shaft 18 is a clutch member 19 having teeth engaging corresponding teeth on the hub of gear 17. A compression spring 20 is mounted on crank shaft 18 between clutch member 19 and a portion of frame 1 to normally maintain the teeth of clutch member 19 in engagement with the teeth of gear 17. A pitman rod 21 connects the crank shaft 18 with knife 9 in order to effect oscillatory movement of said knife. At each end of crank shaft 18 is rigidly secured a fly wheel 22.

In operation, forward movement of the mower is designed to cause rotation of drive wheels 3 and axle 2 and this motion, when gear 10 is in mesh with gear 14 causes rotation of jack shaft 15 which in turn causes rotation of gear 17. The clutch member 19 being in engagement with gear 17 and splined on crank shaft 18 causes rotation of the latter. The high speed at which crank shaft 18 rotates causes considerable momentum in fly wheels 22 so that when the mower is stopped the momentum of fly wheels 22 continues to rotate crank shaft 18 thereby causing several oscillations of knife 9 after the mower has ceased to move. The purpose of this extra movement of the knife 9 is to cause any weeds, grass or the like from remaining in engagement with the knife and cutter bar after the mower has ceased to move. The spring pressed clutch member 19, as will be seen from Fig. 1 normally maintains the clutch teeth between member 19 and gear 17 when the shaft 2 is in motion, but as soon as shaft 2 has ceased to rotate the momentum of fly wheels 22 causes the clutch member 19 to slide longitudinally of crank shaft 18 thereby permitting disengagement of clutch member 19 from gear 17, as will be readily understood from Fig. 1.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A hand operable mowing machine comprising a substantially rectangular frame; an axle journaled through the central portion of said frame; ground wheels on said axle; a crank shaft journaled in said frame at right angles to and passing under said axle; a fly wheel on each end of said crank shaft outside of said frame; a spring pressed clutch on said crank shaft; a train of gears operatively connecting said axle with said clutch; a bent arm on said frame extending around the crank of said crank shaft and provided with a bearing engaging said shaft between the crank thereof and one of said fly wheels; and a cutter bar carried by said frame and operatively connected with said crank shaft, substantially as described.

In testimony whereof I have signed my name to this specification in the presence of two subscribing witnesses.

JOHN P. FORST.

Witnesses:
   JOSHUA R. H. POTTS,
   HELEN F. LILLIS.

---

Copies of this patent may be obtained for five cents each, by addressing the "Commissioner of Patents, Washington, D. C."